(12) United States Patent
Filion et al.

(10) Patent No.: US 12,208,454 B2
(45) Date of Patent: *Jan. 28, 2025

(54) DEBRIS EJECTION TECHNIQUES FOR DRILLING TOOLS

(71) Applicant: Phillips Screw Company, Amesbury, MA (US)

(72) Inventors: Scott M. Filion, Dover, NH (US); Gary E. Dilling, Ashburnham, MA (US); Christopher M. Gallant, Nottingham, NH (US); Carl Marabello, Jr., Bristol, RI (US)

(73) Assignee: PHILLIPS SCREW COMPANY, Amesbury, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/468,839

(22) Filed: Sep. 18, 2023

(65) Prior Publication Data

US 2024/0001457 A1 Jan. 4, 2024

Related U.S. Application Data

(63) Continuation of application No. 17/479,684, filed on Sep. 20, 2021, now Pat. No. 11,772,172.

(60) Provisional application No. 63/166,483, filed on Mar. 26, 2021, provisional application No. 63/084,155, filed on Sep. 28, 2020.

(51) Int. Cl.
*B23B 47/34* (2006.01)
*B23B 51/10* (2006.01)

(52) U.S. Cl.
CPC ............ *B23B 47/34* (2013.01); *B23B 51/109* (2022.01); *B23B 51/104* (2013.01); *B23B 51/108* (2013.01)

(58) Field of Classification Search
CPC ....... B23B 47/34; B23B 51/10; B23B 51/104; B23B 51/107; B23B 51/108; B23B 51/1085; B23B 51/109; B23B 2270/30
See application file for complete search history.

(56) References Cited

U.S. PATENT DOCUMENTS

| | | |
|---|---|---|
| 2,389,909 A | 11/1945 | Hofbauer |
| 2,429,375 A | 10/1947 | Smith |
| 3,302,495 A | 2/1967 | Schmid |

(Continued)

FOREIGN PATENT DOCUMENTS

| | | |
|---|---|---|
| AT | 14439 U1 | 11/2015 |
| DE | 2261297 A1 | 6/1974 |

(Continued)

*Primary Examiner* — Eric A. Gates
(74) *Attorney, Agent, or Firm* — Finch & Maloney PLLC

(57) ABSTRACT

A debris ejector for a drilling tool is disclosed. The ejector may be provided as part of a tool assembly where the ejector is coupled with bit. In an example, a tool includes a cup and a drill bit passing through an internal void of the cup. The cutting end of the bit extends out the open end of the cup at a fixed distance, while an attachment end of the bit extends out the back of the cup. The tool further includes an ejector within the cup. The ejector spins with the bit and independently of the cup. In one example, the ejector includes ramped or angled wings that eject material within the cup. In another example, the ejector includes tapered wings with straight and/or angled walls that push material out of the cup through one or more holes of the cup.

20 Claims, 6 Drawing Sheets

(56) References Cited

U.S. PATENT DOCUMENTS

| | | |
|---|---|---|
| 5,310,341 A | 5/1994 | Byer |
| 5,570,978 A | 11/1996 | Rees et al. |
| 5,772,367 A | 6/1998 | Daniel |
| 6,146,066 A | 11/2000 | Yelton |
| 7,258,513 B2 | 8/2007 | Gertner |
| 7,510,356 B2 | 3/2009 | Colon |
| 8,684,639 B2 | 4/2014 | Kruse et al. |
| 8,696,271 B2 | 4/2014 | Dickey |
| 8,944,726 B2 | 2/2015 | Lange et al. |
| 9,597,785 B1 | 3/2017 | Gertner |
| 11,407,042 B2 | 8/2022 | Belinda et al. |
| 11,484,983 B2 | 11/2022 | Chen |
| 11,772,172 B2 * | 10/2023 | Filion ............... B23B 47/34 408/99 |
| 2009/0214309 A1 | 8/2009 | Rees et al. |
| 2022/0097149 A1 | 3/2022 | Filion et al. |

FOREIGN PATENT DOCUMENTS

| | | |
|---|---|---|
| DE | 3141029 C1 | 12/1982 |
| DE | 102005012293 A1 | 9/2006 |
| DE | 102007030858 A1 | 2/2008 |
| FR | 2578461 A1 | 9/1986 |
| JP | H06114674 A | 4/1994 |
| JP | 2006102895 A | 4/2006 |
| JP | 2007083345 A | 4/2007 |
| JP | 2009233774 A | 10/2009 |
| WO | 2016108800 A1 | 7/2016 |

\* cited by examiner

DEBRIS EJECTION TECHNIQUES FOR DRILLING TOOLS

CROSS REFERENCE TO RELATED APPLICATIONS

This application is a continuation of U.S. patent application Ser. No. 17/479,684 filed Sep. 20, 2021, which claims the benefit of U.S. Provisional Application No. 63/166,483 filed Mar. 26, 2021, and U.S. Provisional Application No. 63/084,155 filed Sep. 28, 2020, the disclosures of which are each incorporated herein by reference in their entirety.

FIELD OF THE DISCLOSURE

This disclosure relates to fastener systems, and more particularly, to debris ejection techniques for drilling tools.

BACKGROUND

Fastener applications oftentimes involve the use of a countersunk fastener, such as a screw. Prior to installing the fastener, counterbore holes are pre-drilled into the board or workpiece using a counterbore tool. The counterbore depth is set precisely to accommodate the larger head of the fastener. In some applications the head of the fastener is color-matched to the board or other workpiece being fastened and set so that the head is relatively flush with the workpiece. Other applications set the fastener deeper to accommodate a plug that fits snugly in the hole and conceals the fastener after installation. There are a number of non-trivial issues with such counterbore tools.

Figure 1B:
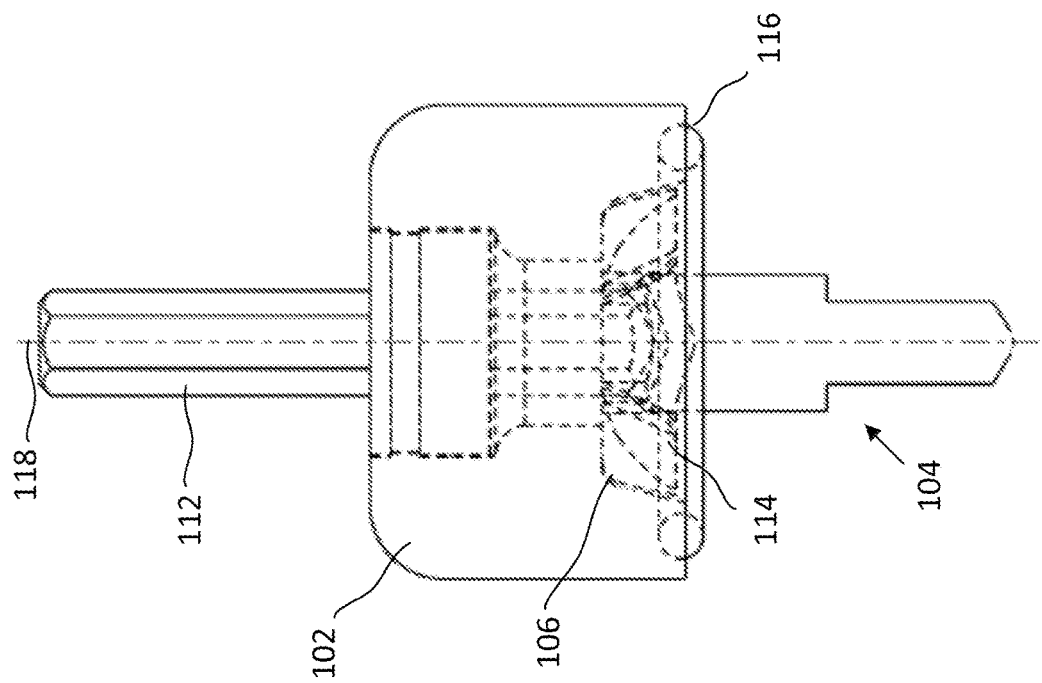
FIGS. 1A and 1B illustrate different views of a counterbore tool configured in accordance with some embodiments of the present disclosure.

Although the following Detailed Description will proceed with reference being made to illustrative embodiments, many alternatives, modifications, and variations thereof will be apparent in light of this disclosure. As will be further appreciated, the figures are not necessarily drawn to scale or intended to limit the present disclosure to the specific configurations shown.

DETAILED DESCRIPTION

A debris ejector for a drilling tool is disclosed. In some cases, the ejector may be provided, for example, as part of a tool assembly. The assembly can vary but in some example cases includes a rotary tool cup, a drill bit that passes through the cup, and the ejector attached to the drill bit within the cup; in other examples the assembly may include the drill bit and the ejector, which can be later joined with the rotary tool cup; in still other examples, the ejector can be acquired separately and subsequently attached to the drill bit and cup assembly. In an example embodiment, a drilling tool includes a cup having an internal void and an open end. A drill bit passes through the internal void of the cup. In some cases, the drill bit includes a counterbore feature. The cutting end of the bit extends out the open end of the cup, while the attachment end of the bit extends out the back of the cup to allow for connection to a rotary tool. The tool further includes an ejection mechanism within the cup. The ejection mechanism spins with the drill, and can spin independently of the cup. In some such embodiments, the ejection mechanism is configured with ramped or angled wings that help eject material trapped or compacted within the cup after boring a hole. In another embodiment, the ejection mechanism includes tapered wings with straight walls that push material trapped or compacted within the cup out of the cup through one or more holes around a circumferential portion of the cup. Numerous embodiments will be appreciated in light of this disclosure.

General Overview

As previously explained, there are a number of non-trivial issues with respect to counterbore tools. For instance, some counterbore tools have a flat surface that makes contact with the board or other workpiece surface to stop the boring at the appropriate depth. The downside to this design is that the flat surface effectively traps a significant amount of shavings in the hole being drilled. These shavings should be removed to properly seat the fastener at the correct depth. To address this problem, another design has a cup that allows material to exit the hole during boring. The hole is clean after boring, but the cup tends to fill up quickly with liberated material of the workpiece and does not discharge that material easily. This problem is exacerbated if many holes are drilled consecutively, where the cup will effectively become jammed with liberated material and will start to prevent the counterbore from being made at the proper depth. In addition, the material trapped in the cup becomes compacted or otherwise difficult to remove. Thus, installers are faced with the periodic task of removing compacted debris from the cup, which adds time to the given project.

Thus, cup-based drilling tool designs are provided herein that help with clearing the cup of trapped debris. In an example, a counterbore tool includes a cup that allows material to exit the hole during boring. In addition, a debris ejection mechanism inside the cup spins with the bit. Like the bit, the ejection mechanism can spin independently of the cup, and thus helps to eject material trapped within the cup. For example, in a cup clearing operation, the installer can hold the outside of the cup while the bit and ejection mechanism are spinning, thereby ejecting or otherwise loosening debris within the cup. In an embodiment, the ejection mechanism is configured with ramped wings that have a plow-like effect to help eject the material from the cup after boring the hole. In another embodiment, the debris ejection mechanism includes tapered wings with straighter walls (relative to the ramped wings) that push material trapped or compacted within the cup out of the cup through one or more holes around a circumferential portion of the cup. Any number of debris ejection configurations that can spin with the bit and independent of the cup will be appreciated in light of this disclosure.

According to an embodiment, a counterbore tool includes a cup having an internal void and an open end, a drill bit that passes through the internal void of the cup and, and an ejector within the cup. A length of the drill bit extends out the open end of the cup at a fixed distance and includes a bore section and a counterbore section. The ejector is separate from the drill bit and coupled to the drill bit such that the ejector is configured to spin with the drill bit, independently of the cup, so as to push debris within the cup.

According to another embodiment, a tool includes a body having a central portion and at least two wing portions extending from the central portion, and a drill bit separate from the body. The drill bit has a bore section and a counterbore section. The counterbore section is coupled to the central portion of the body and extends away from the body along a first direction, such that rotation of the drill bit about an axis along a length of the drill bit in the first direction causes a corresponding rotation of the body. The at least two wing portions extend away from the central portion along a second direction orthogonal to the first direction. Each of the at least two wing portions includes a wall that rotates about the axis with the drill bit.

According to another embodiment, a tool includes a cup having an internal void, an open end at a bottom of the cup, and one or more openings extending along a circumference of the cup, a drill bit that passes through the internal void of the cup such that a length of the drill bit extends out the open end of the cup at a fixed distance, and an ejector separate from the drill bit and within the cup. The drill bit includes a bore section and a counterbore section. The ejector is coupled to the drill bit such that the ejector is configured to spin with the drill bit, independently of the cup, and such that one or more surfaces of the ejector push workpiece debris within the cup as the one or more surfaces spin with the drill bit, so as to facilitate ejection of the workpiece debris through the one or more openings.

Tool Structure

Figure 1A:
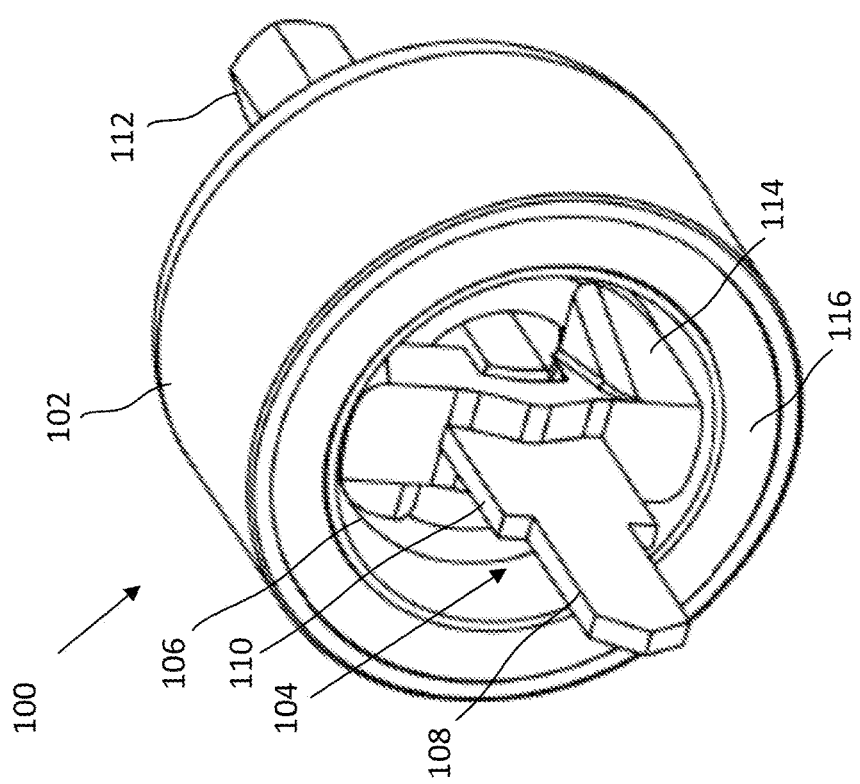

FIGS. 1A and 1B illustrate perspective and cross-section views of a counterbore tool 100, according to some embodiments. Counterbore tool 100 includes a cup 102 and a flat drill bit 104 that passes through an internal void 106 within cup 102 and out an open end of cup 102. According to some embodiments, a debris ejection mechanism (also referred to as an ejector blade 114) sits within internal void 106 of cup 102. Ejector blade 114 represents one possible design for a debris ejection mechanism as will be appreciated herein.

Figure 1C:
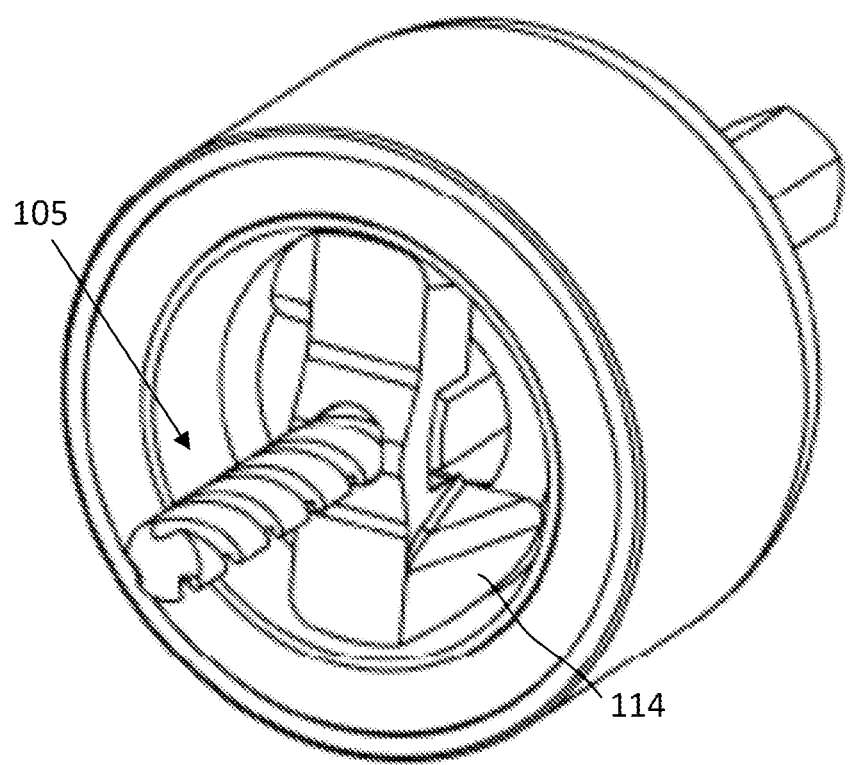
FIG. 1C illustrates a perspective view of a rotary tool configured in accordance with an embodiment of the present disclosure.

According to some embodiments, flat drill bit 104 includes a base section 110 coupled to ejector blade 114 and a bore section 108 coupled to base section 110. Base section 110 is wider than bore section 108 to form the counterbore hole in the workpiece. Flat drill bit 104 may be part of or otherwise coupled to a long shank 112 that extends out a backside of cup 102. Shank 112 may be coupled to a drill or other similar tool used to rotate flat drill bit 104. It should be noted that flat drill bit 104 may be a variety of different drill shapes, such as cylindrical or screw shapes, without affecting the general shape or function of ejector blade 114. For example, FIG. 1C illustrates a rotary tool having a cylindrical drill bit 105 coupled to ejector blade 114. Note bit 105 has no counterbore feature. In another embodiment, bit 105 may include a wider base portion to act as a counterbore bit. To this end, note the techniques provided herein may be used with or without a counterbore feature, and the present disclosure is not intended to be limited to counterbore tools (the ejector mechanisms provided herein can be used with non-counterbore bits as well as counterbore bits).

According to some embodiments, ejector blade 114 includes a slot through a central portion of its body so that flat drill bit 104 can pass through it. Rotation of flat drill bit 104 about axis 118 that passes along a length of flat drill bit 104 causes a corresponding rotation of ejector blade 114 within cup 102. In cases where a round drill bit is used (such as shown in FIG. 1C), a detent or male (or female) locking feature can be provided on the shaft of the round bit, and a complementary locking feature can be provided in the central hole of the body of ejector blade 114, so as to allow ejector blade 114 to spin with the round bit. As ejector blade 114 rotates within cup 102, it loosens and/or ejects debris out of the open front end of cup 102. Ejector blade 114 may include one or more ramped portions to more effectively eject the debris as described in more detail in FIGS. 2A and 2B.

As can further be seen, counterbore tool 100 may include an O-ring 116 around the perimeter of the cup edge adjacent to the front opening that engages with a workpiece surface. O-ring 116 can be used to help protect the workpiece from marring as well as to help stabilize cup 102 when cup 102 contacts the workpiece. Cup 102 and ejector blade 114 can be, for instance, plastic. Flat drill bit 104 (sometimes known as a blade, but not to be confused with the ejector blade) can be, for example, any carbon steel grade or a suitable metal. O-ring 116 can be any suitable pliant material such as, for example, rubber. Numerous suitable materials will be apparent for any of the elements of counterbore tool 100.

The illustrated embodiments are not limited to specific dimensions of various elements of the counterbore tool. For example, the front opening of cup 102 may be flush with a top of ejector blade 114, or ejector blade 114 may be set deeper within cup 102; likewise, the diameter (or diameters, as the case may be) of cup 102 can vary depending on particulars of an intended application; likewise, the ejector blade 114 may be configured with any number of features that rotate independently of cup 102 to help to dislodge or otherwise expel debris from cup 102 during a cup cleaning operation, and the shape, length, width and height of those rotatable features can vary from one embodiment to the next, as will be appreciated in light of this disclosure. Furthermore, the length of flat drill bit 104 that extends out from cup 102 may vary between different designs. In some embodiments, for instance, a washer may be included within cup 102 against a metal bushing or comparable feature of drill bit 104. Other embodiments may exclude or otherwise reduce such metal-to-metal contact, in effort to avoid or otherwise reduce heat generation during operation of the rotary tool. For instance, in some examples, non-metal components such as a non-metal washer and bushing arrangement can be used to improve heat-resistance relative to a metal-containing washer and bushing arrangement. Example non-metal materials include, for instance, plastics such as nylon, polyetheretherketone or PEEK, polytetrafluoroethylene or PTFE (e.g., Teflon®), and polyoxymethylene (e.g., Delrin®). Still other embodiments may not include such arrangements, to reduce the number of moving parts or components making up the counterbore tool 100. In other embodiments a ball bearing or bearing assembly can be used to reduce friction; other friction reducing mechanisms can also be used. In some such embodiments, for instance, the counterbore tool 100 includes only bit 104, cup 102, and ejector 114.

Figure 2A:
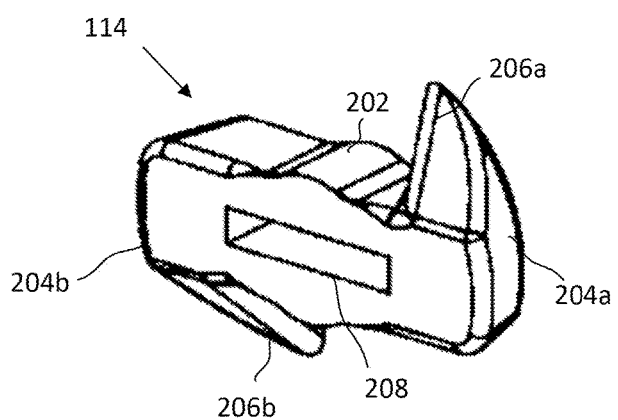
FIGS. 2A and 2B illustrate different views of an ejector blade used in the counterbore tool of FIGS. 1A and 1B, in accordance with some embodiments of the present disclosure.
Figure 2B:
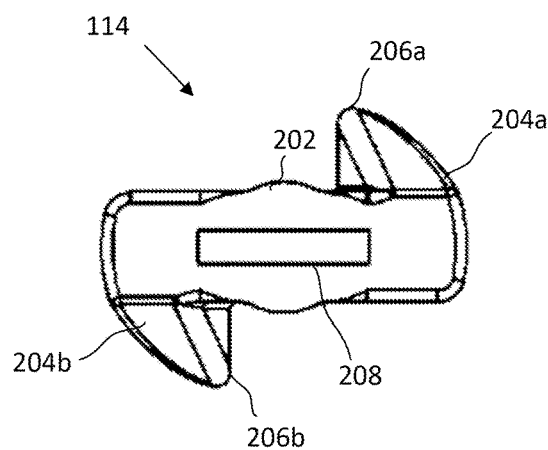

FIGS. 2A and 2B illustrate perspective and plan views of ejector blade 114, according to some embodiments. Ejector blade 114 may include a body 202 made of a sufficiently rigid material, such as high-grade plastic. One or more wings may extend outwards from body 202, such as a first wing 204a and a second wing 204b. According to some embodiments, each of first wing 204a and second wing 204b includes a corresponding ramp 206a and 206b that provides an angled surface, such as an angle of less than 90 degrees with respect to a tangential direction of rotation. The ramps may be provided to help loosen and/or clear debris within cup 102 as ejector blade 114 spins. The exact geometry of the ramped wings (e.g., such as length in lateral and longitudinal directions, ramp angle, and any ramp curvature) can vary, but any such configurations will be helpful in ejecting or otherwise loosening material trapped in cup 102 as ejector blade 114 spins. In one such example, each of ramp 206a and 206b is angled at about 45 degrees with respect to the tangential direction of rotation. In some embodiments, ejector blade 114 has an elongated body 202 having a centrally located slot 208 along its longitudinal axis. Slot 208 may be sized to accommodate flat drill bit 104. Slot 208 may take on any other shape to accommodate differently sized and/or shaped drill bits.

Figure 5A:
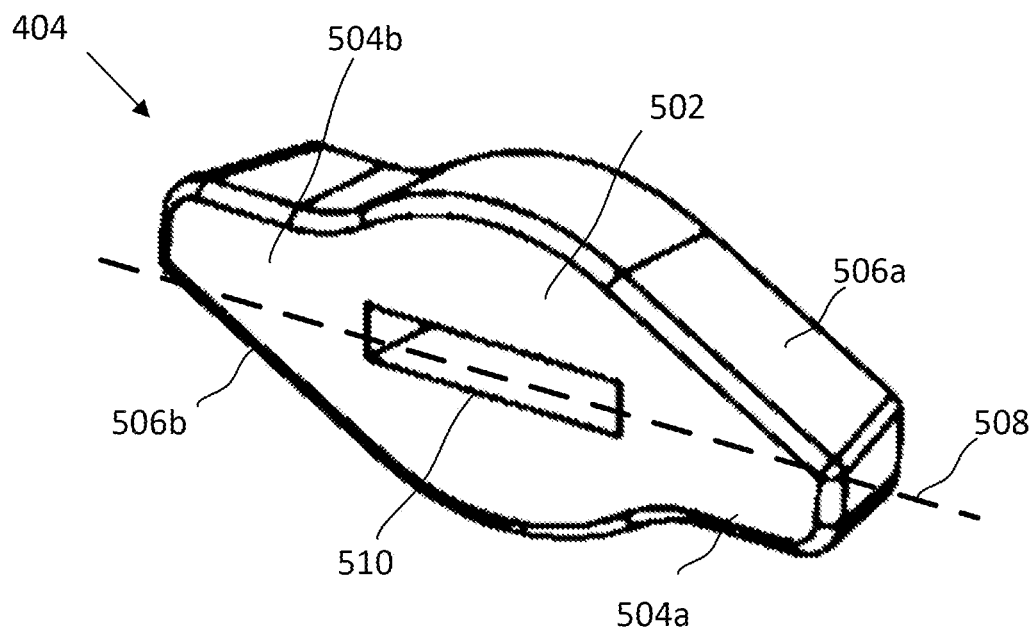
FIGS. 5A and 5B illustrate example debris ejection mechanisms used in the counterbore tool of FIGS. 4A and 4B, in accordance with some embodiments of the present disclosure.
Figure 5B:
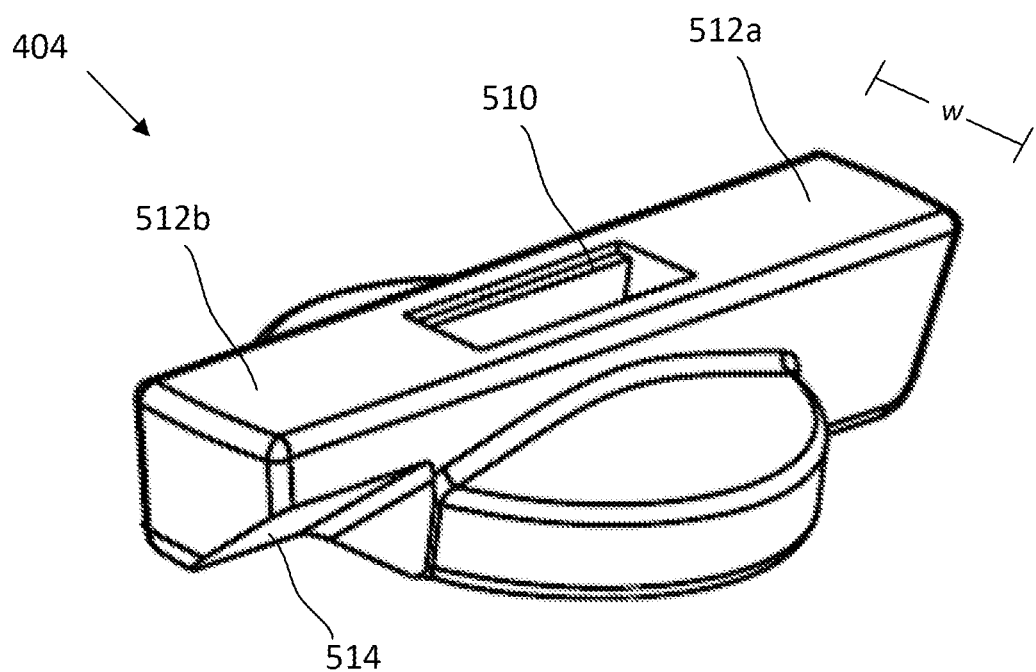

Other embodiments of ejector blade 114 may have features other than ramped wings. For example, another example ejector blade design includes one or more posts that extend laterally outward from the central body 202, to one or both sides of a longitudinal axis. As will be appreciated, such laterally extending posts or features will help to dislodge material within cup 102, in a similar fashion to the ramped wings. In a more general sense, ejector blade 114 may include any features capable of disrupting, ejecting, and/or loosening of material within cup 102 as ejector blade 114 spins. FIGS. 5A and 5B show other example ejection mechanisms and will be discussed in turn.

Figure 3:
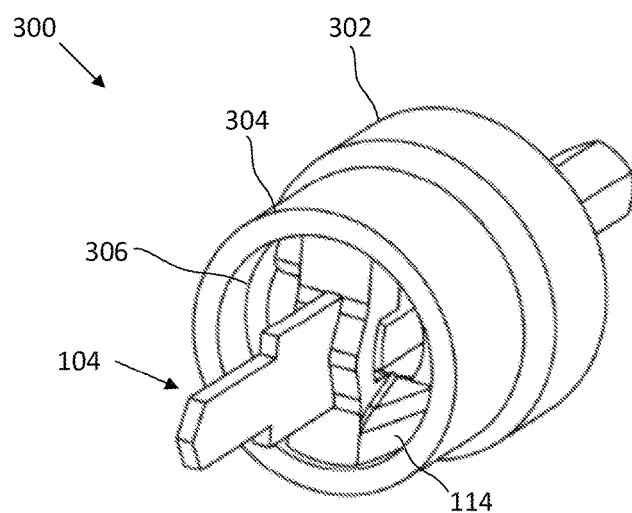
FIG. 3 illustrates another counterbore tool configured in accordance with some embodiments of the present disclosure.

FIG. 3 illustrates another embodiment of a counterbore tool 300. Counterbore tool 300 is similar to counterbore tool 100, except that the cup of counterbore tool 300 includes two stepped portions. A first cup portion 302 has a first diameter and a second cup portion 304 has a second diameter smaller than the first diameter. Second cup portion 304 defines an internal void 306. According to some embodiments, ejector blade 114 spins within internal void 306 of second cup portion 304 to clear debris.

Figure 4B:
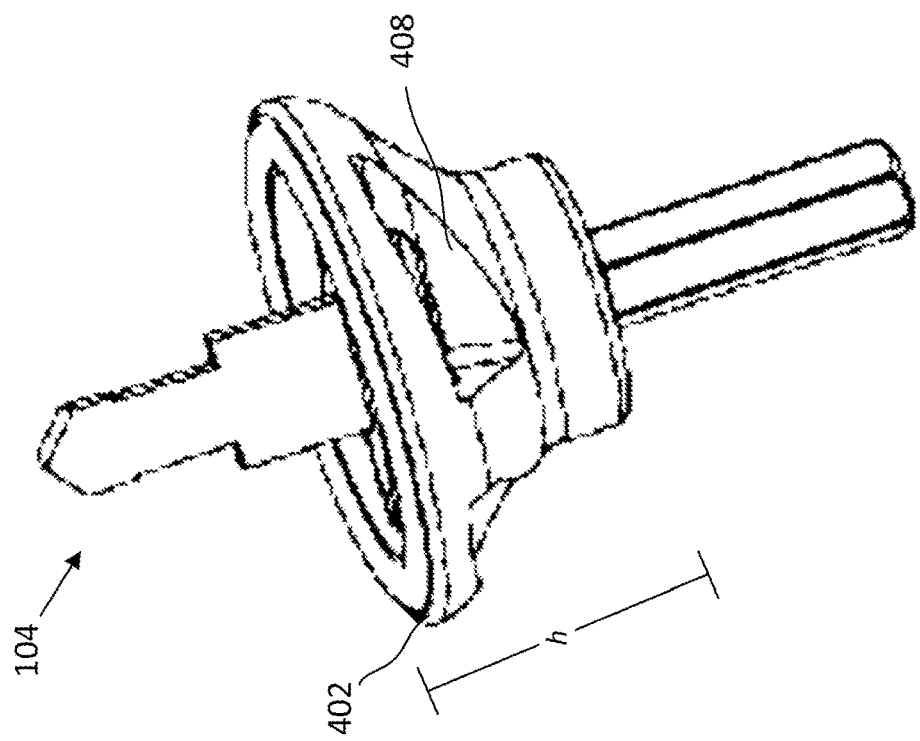
FIGS. 4A and 4B illustrate different views of another counterbore tool configured in accordance with some embodiments of the present disclosure.
Figure 4A:
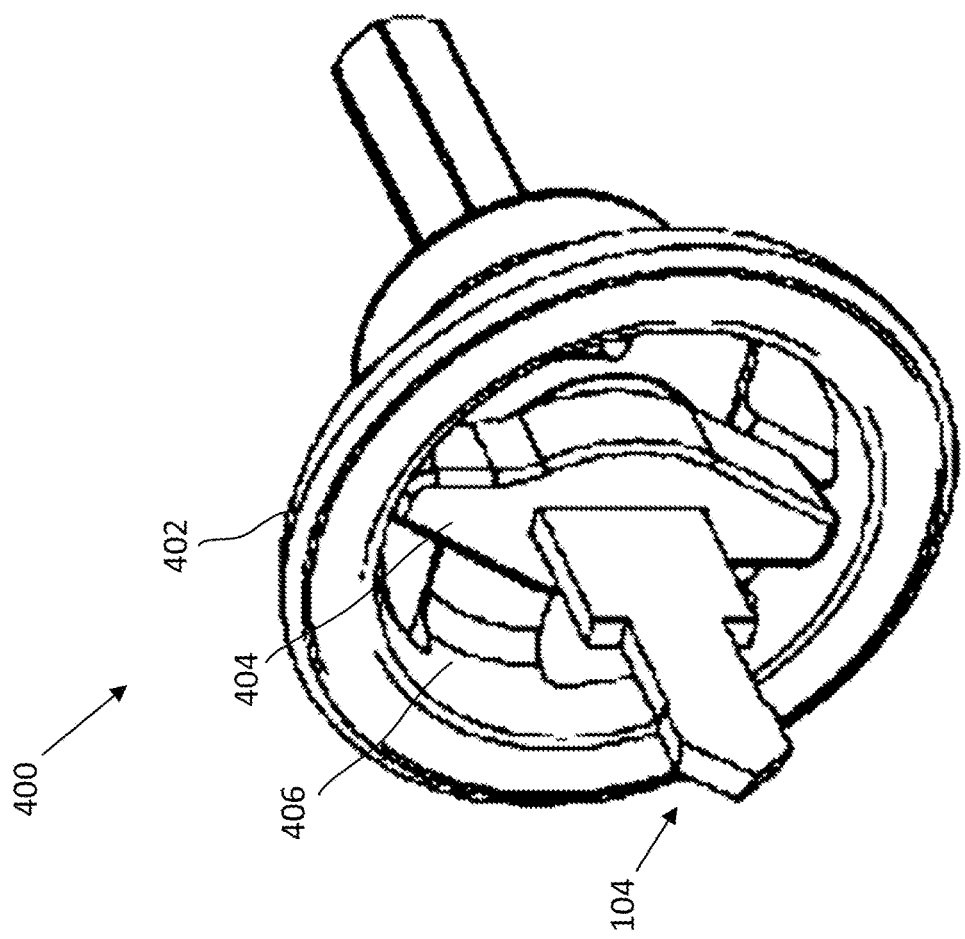

FIGS. 4A and 4B illustrate different views of another example embodiment of a counterbore tool 400 that includes a different cup design and a differently designed ejection mechanism. According to some embodiments, counterbore tool 400 includes a cup 402 that is generally shallower than cup 102 and has a tapered width that gradually increases towards the direction of the end of flat drill bit 104. Similar to counterbore tool 100, flat drill bit 104, which may be configured with a counterbore cutter, extends outward from a central portion of cup 402 and is coupled to a rotatable ejector 404 such that rotatable ejector 404 is configured to spin with flat drill bit 104 independently from cup 402. As discussed above, flat drill bit 104 may be a variety of different drill shapes, such as cylindrical or screw shapes, without affecting the general shape or function of rotatable ejector 404. Rotatable ejector 404 represents another example for a debris ejection mechanism. In some embodiments, rotatable ejector 404 is situated within an internal void 406 of cup 402 such that no portion of rotatable ejector 404 extends out from the front opening of cup 402. As discussed above, rotatable ejector 404 may be used to loosen and/or remove debris from within cup 402. According to some embodiments, cup 402 includes one or more openings 408 that extend through a wall of cup 402 towards rotatable ejector 404. The one or more openings 408 may be arranged such that debris dislodged from within cup 402 via the rotatable ejector 404 is forced out from internal void 406 of cup 402 through any of one or more openings 408. According to some embodiments, one or more openings 408 may include a plurality of openings that are spaced equidistant from one another around a circumferential portion of cup 402. In some embodiments, a washer is included within cup 402 against a bushing of flat drill bit 104. As previously explained, other embodiments may exclude or reduce metal-to-metal contact, and use non-metal components such as a non-metal washer and bushing arrangement to improve heat-resistance, or exclude such components altogether. In some such embodiments, for instance, the counterbore tool 400 includes only bit 104, cup 402, and rotatable ejector 404. Further recall that tool 400 may also be similarly implemented without the counterbore feature. The previous relevant discussion is equally applicable here.

According to some embodiments, cup 402 has an outer diameter at its largest opening of between about 30 mm and about 50 mm, such as around 44 mm. According to some embodiments, internal void 406 within which rotatable ejector 404 spins has a diameter between about 25 mm and about 35 mm, such as around 33 mm. According to some embodiments, internal void 406 has a depth between about 5 mm and about 10 mm, such as around 7.3 mm. A height h of cup 402 is between about 20 mm and about 30 mm, such as around 24 mm, according to some embodiments. Other embodiments may have different dimensions than these example dimensions, as will be appreciated in light of this disclosure.

FIG. 5A illustrates a perspective view of rotatable ejector 404, according to an embodiment. Rotatable ejector 404 may include a body 502 made of a sufficiently rigid material, such as high-grade plastic. One or more wings may extend outwards from body 502, such as a first wing 504a and a second wing 504b. According to some embodiments, each of first wing 504a and second wing 504b taper in width as they extend away from body 502. According to some embodiments, each of first wing 504a and second wing 504b includes a corresponding straight wall section 506a and 506b that are designed to push debris outwards towards the ends of first wing 504a and second wing 504b (and ultimately out of any one of one or more openings 408). In some embodiments, straight walls are used along an entire outer surface of rotatable ejector 404. According to some embodiments, straight wall sections 506a and 506b may be angled with respect to an axis 508 passing through a center of rotatable ejector 404 and along a length of rotatable ejector 404 such that the rotation of rotatable ejector 404 causes debris to move along straight wall section 506a and 506b towards the ends of first wing 504a and second wing 504b. As will be appreciated, the exact geometry of the wings and wall sections (e.g., such as length in lateral and longitudinal directions, angle from axis 508, and any wall curvature) can vary, but any such configurations will generally be helpful in ejecting, pushing, or otherwise loosening material trapped in cup 402 as rotatable ejector 404 spins. In some embodiments, rotatable ejector 404 has an elongated body 502 having a centrally located slot 510 along its longitudinal axis 508. Slot 510 may be sized to accommodate flat drill bit 104. Slot 510 may take on any other shape to accommodate differently sized and/or shaped drill bits.

FIG. 5B illustrates a perspective view of another design for rotatable ejector 404, according to an embodiment. The design illustrated in FIG. 5B similarly includes an elongated body with a centrally located slot 510. The design may further include one or more straight wings, such as wing 512a and wing 512b that extend away from the body. One or both wing 512a and 512b may include an angled wall 514 that assists in pushing debris out of any of one or more openings 408, according to some embodiments. Angled wall 514 may be, for instance, at an acute angle, such as a 45-degree angle, with respect to a tangential rotation direction of rotatable ejector 404. According to some embodiments, wing 512a and wing 512b have a width w between about 3 mm and about 8 mm, such as around 5.8 mm.

As previously explained, rotatable ejector 404 may include any features capable of disrupting, ejecting, and/or loosening of material within cup 402 as rotatable ejector 404 spins. Accordingly, rotatable ejector 404 may include any number of protruding and/or angled features to sweep, push or otherwise move debris towards the one or more openings 408 as rotatable ejector 404 spins within cup 402.

Figure 6B:
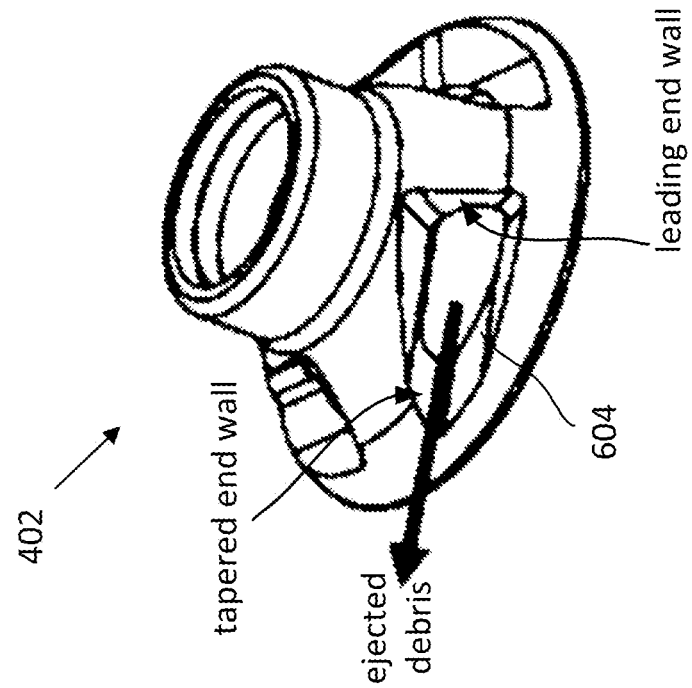
FIGS. 6A and 6B illustrate different designs for a cup used in the counterbore tool of FIGS. 4A and 4B, in accordance with some embodiments of the present disclosure.
Figure 6A:
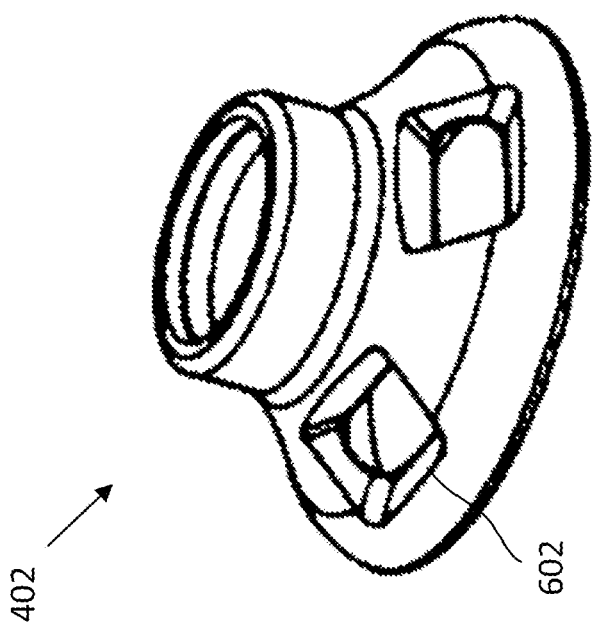

FIGS. 6A and 6B illustrate views of two different opening designs on cup 402, according to some embodiments. FIG. 6A illustrates a first design where openings 602 extend straight outward through a wall of cup 402. Although two openings 602 are illustrated in this view, it will be appreciated that any number of openings 602 can be used around a circumferential portion of cup 402, and that such openings 602 may be spaced equidistant from one another. Due to the tangential nature of the ejecting debris, the walls of the straight openings 602 may catch the debris as it is being ejected from within cup 402, which may be susceptible to clogging all or part of the openings. FIG. 6B illustrates a second design that help avoid or otherwise mitigate such clogging. According to an embodiment, the second design includes a plurality of openings 604 that extend further in a lengthwise direction (e.g., tangential to an outer circumference of the cup as shown by the arrow) than they do in a height direction. In some embodiments, the walls around openings 604 are also sloped in a tangential direction as indicated by the arrow such that debris can exit from within cup 402 along the illustrated tangential direction without impacting the walls around openings 604. By stretching the openings out along the circumference of the cup, debris is more easily expelled through any of openings 604 without getting caught at the walls around the openings. In one example case as shown in FIG. 6B, the openings 604 are elongated in the circumferential direction, and a sidewall at one end of the openings 604 is tapered to facilitate ejection of debris when the tool is rotating in a cup clearing operation. The tapered end of a given elongated opening 604 effectively follows the other leading end of the elongated opening 604 as the tool is rotating in the direction of a cup clearing operation. It will be appreciated that any number of openings 604 can be used around a circumferential portion of cup 402, and that such openings 604 may be spaced equidistant from one another. Moreover, openings 604 configured to eject debris in the other rotation direction may be included as well. Some embodiments may be configured for such debris ejection in either rotation direction, or in both rotation directions. In some embodiments, either the first or second opening design may be used with counterbore tool 400.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A tool, comprising:
a cup having an internal void and an open end;
a drill bit that passes through the internal void of the cup and a length of the drill bit extends out the open end of the cup at a fixed distance, the length including a bore section and a counterbore section; and
an ejector separate from the drill bit and within the cup, wherein the counterbore section of the drill bit is directly coupled to and contacts a central portion of the ejector and extends away from the ejector such that the ejector is configured to spin with the drill bit, independently of the cup, so as to push debris within the cup.

2. The tool of claim 1, wherein the ejector includes one or more wings extending laterally from a body portion of the ejector, each of the one or more wings having an angled wall, such that the one or more angled walls of the one or more wings push debris within the cup as the one or more angled walls spin with the drill bit.

3. The tool of claim 1, wherein the drill bit has a shaft that extends along an axis, and the ejector includes one or more sidewalls that are angled relative to the axis, and the one or more sidewalls push debris within the cup as the one or more sidewalls spin with the drill bit.

4. The tool of claim 1, wherein the drill bit has a shaft that extends along an axis, and the ejector includes sidewalls that are straight in that the sidewalls extend in a direction that is parallel to the axis, and the one or more sidewalls push debris within the cup as the one or more sidewalls spin with the drill bit.

5. The tool of claim 4, wherein the ejector includes two or more wings each having at least one of the straight sidewalls, each wing tapering in width as it extends away from the axis.

6. The tool of claim 1, wherein the cup includes one or more openings around a circumferential portion of the cup.

7. The tool of claim 6, wherein the drill bit has a shaft that extends along an axis, and the one or more openings extend further in a circumferential direction than they do in a height direction, the circumferential direction corresponding to a spin direction of the drill bit, and the height direction corresponding to a direction of the axis.

8. The tool of claim 6, wherein at least one of the one or more of the openings has a tapered end wall that follows a leading end wall as the ejector is rotating in a direction.

9. The tool of claim 8, wherein the direction is a first rotation direction of the ejector, and wherein at least one of the one or more openings has a tapered end wall that follows a leading end wall as the ejector rotates in a second rotation direction.

10. The tool of claim 1, further comprising a bushing that secures the cup to the drill bit.

11. A tool, comprising:
a body having a central portion and at least two wing portions extending from the central portion; and
a drill bit separate from the body and comprising a bore section and a counterbore section, wherein the counterbore section is coupled to the central portion of the body and extends away from the body along a first direction, such that rotation of the drill bit about an axis along a length of the drill bit in the first direction causes a corresponding rotation of the body,
wherein the at least two wing portions extend away from the central portion along a second direction orthogonal to the first direction, and wherein each of the at least two wing portions includes a wall that rotates about the axis with the drill bit,
wherein the body is configured to rotate within a cup of a rotary tool to sweep debris within the cup.

12. The tool of claim 11, wherein the wall is a first wall, and wherein the at least two wing portions each include a second wall with a flat face at an angle greater than zero and less than 90 degrees from the first direction.

13. The tool of claim 11, wherein the at least two wing portions each taper in width along a third direction as they extend away from the body along the second direction, the third direction being orthogonal to the second direction.

14. The tool of claim 11, further comprising the cup, wherein the cup includes one or more openings, and the body is configured to spin with the drill bit, independently of the cup, so as to facilitate ejection of debris from the cup through the one or more openings.

15. The tool of claim 14, wherein the drill bit extends out of the open end of the cup such that a distance between a distal end of the drill bit and a distal end of the cup is substantially fixed.

16. The tool of claim 11, wherein the wall of each of the at least two wing portions includes a flat face that is parallel to the first direction.

17. A tool, comprising:
   a cup having an internal void, an open end at a bottom of the cup, and one or more openings extending along a circumference of the cup;
   a drill bit that passes through the internal void of the cup such that a length of the drill bit extends out the open end of the cup at a fixed distance, the dill bit including a bore section and a flat counterbore section; and
   an ejector separate from the drill bit and within the cup, wherein the flat counterbore section of the drill bit extends through a slot in a central portion of the ejector such that the ejector is configured to spin with the drill bit, independently of the cup, and such that one or more surfaces of the ejector are configured to push workpiece debris within the cup as the one or more surfaces spin with the drill bit, so as to facilitate ejection of the workpiece debris through the one or more openings.

18. The tool of claim 17, wherein the drill bit has a shaft that extends along an axis, and the one or more openings extend further in a circumferential direction than they do in a height direction, the circumferential direction corresponding to a spin direction of the drill bit, and the height direction corresponding to a direction of the axis.

19. The tool of claim 17, wherein at least one of the one or more of the openings has a tapered end wall that follows a leading end wall as the ejector is rotating in a direction.

20. The tool of claim 19, wherein the direction is a first rotation direction of the ejector, and wherein at least one of the one or more openings has a tapered end wall that follows a leading end wall as the ejector rotates in a second rotation direction.

* * * * *